United States Patent
Kulangara et al.

(10) Patent No.: US 7,751,153 B1
(45) Date of Patent: Jul. 6, 2010

(54) SUSPENSION ASSEMBLY HAVING RECESSED ACTUATOR WITH SIMPLIFIED LEAD CONNECTION

(75) Inventors: Sivadasan K. Kulangara, Murietta, CA (US); Shijin Mei, Murietta, CA (US); Steve Misuta, Temecula, CA (US); Christopher Schreiber, Lake Elsinore, CA (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 12/533,459

(22) Filed: Jul. 31, 2009

Related U.S. Application Data

(63) Continuation of application No. 11/282,305, filed on Nov. 18, 2005, now Pat. No. 7,595,965.

(51) Int. Cl.
 G11B 5/48 (2006.01)
(52) U.S. Cl. .................................. 360/294.6
(58) Field of Classification Search ........................ None
 See application file for complete search history.

(56) References Cited

U.S. PATENT DOCUMENTS

| | | | |
|---|---|---|---|
| 6,614,628 B2 * | 9/2003 | Crane et al. ............... | 360/294.5 |
| 6,870,710 B2 | 3/2005 | Hida et al. | |
| 6,917,498 B2 | 7/2005 | Kuwajima et al. | |
| 7,023,667 B2 | 4/2006 | Shum | |
| 7,046,485 B2 | 5/2006 | Kuwajima et al. | |
| 7,072,149 B2 | 7/2006 | Kuwajima et al. | |
| 7,218,481 B1 * | 5/2007 | Bennin et al. ............. | 360/294.4 |
| 7,403,357 B1 * | 7/2008 | Williams ................... | 360/245.9 |
| 7,440,236 B1 * | 10/2008 | Bennin et al. ............. | 360/294.4 |
| 7,468,866 B2 * | 12/2008 | Yang et al. ................. | 360/245.9 |
| 7,518,830 B1 * | 4/2009 | Panchal et al. ............ | 360/245.8 |
| 7,688,553 B1 * | 3/2010 | Williams et al. .......... | 360/245.3 |
| 2002/0048124 A1 | 4/2002 | Kuwajima et al. | |
| 2003/0123196 A1 * | 7/2003 | Shiraishi et al. ........... | 360/294.4 |

OTHER PUBLICATIONS

Notice of Allowance and Fees Due dated Jul. 10, 2009 in U.S. Appl. No. 11/282,305, 9 pp.
Office Action dated Mar. 10, 2009 in U.S. Appl. No. 11/282,305, 9 pp.
Request for Reconsideration dated Jun. 9, 2009 in U.S. Appl. No. 11/282,305, 8 pp.

(Continued)

*Primary Examiner*—Mark Blouin
(74) *Attorney, Agent, or Firm*—Intellectual Property Law Offices of Joel Voelzke, APC

(57) ABSTRACT

A head suspension assembly couples a baseplate to a rotatable load through a planar triangular piezo microactuator for effecting hingeless rotation of the load. The microactuator expands, responsive to an excitation voltage, with greater magnitude in one direction than in another direction normal to the first direction, resulting in an angular movement of the hypotenuse thereby rotating the load. The upper surface of the microactuator is grounded to a bottom surface of the baseplate or load beam to position the microactuator lead connection surface closest to the load to facilitate trace routing. A load beam grounding surface may be raised to accommodate the microactuator and fix the lead connection surface on a common plane with the unraised surface to further minimize trace routing and provide access for bonding the trace to the load beam.

23 Claims, 20 Drawing Sheets

OTHER PUBLICATIONS

Amendment in response to Office Action dated Nov. 4, 2009 in U.S. Appl. No. 11/282,305, 16 pp.

Office Action dated Nov. 4, 2008 in U.S. Appl. No. 11/282,305, 8 pp.

Election in response to Restriction Requirement dated Sep. 5, 2008 in U.S. Appl. No. 11/282,305, 1 pp.

Restriction Requirement dated Sep. 5, 2008 in U.S. Appl. No. 11/282,305, 4 pp.

* cited by examiner

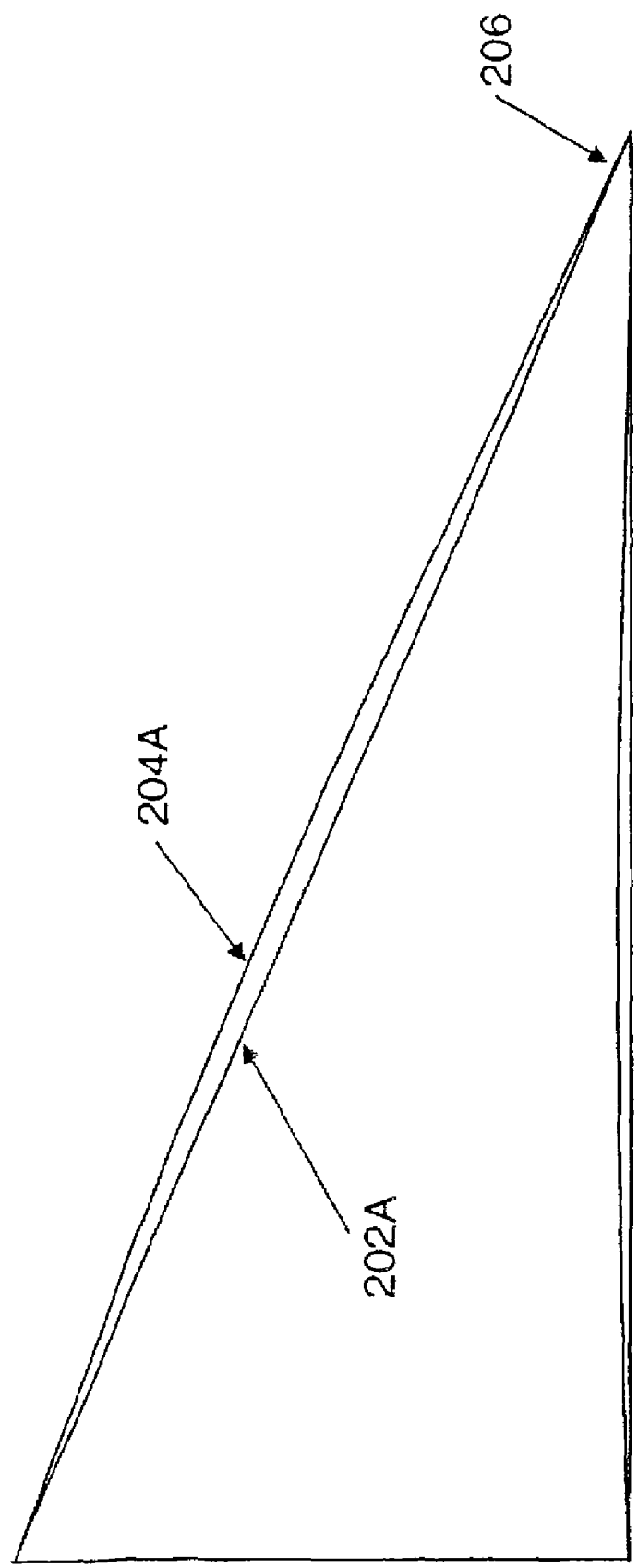

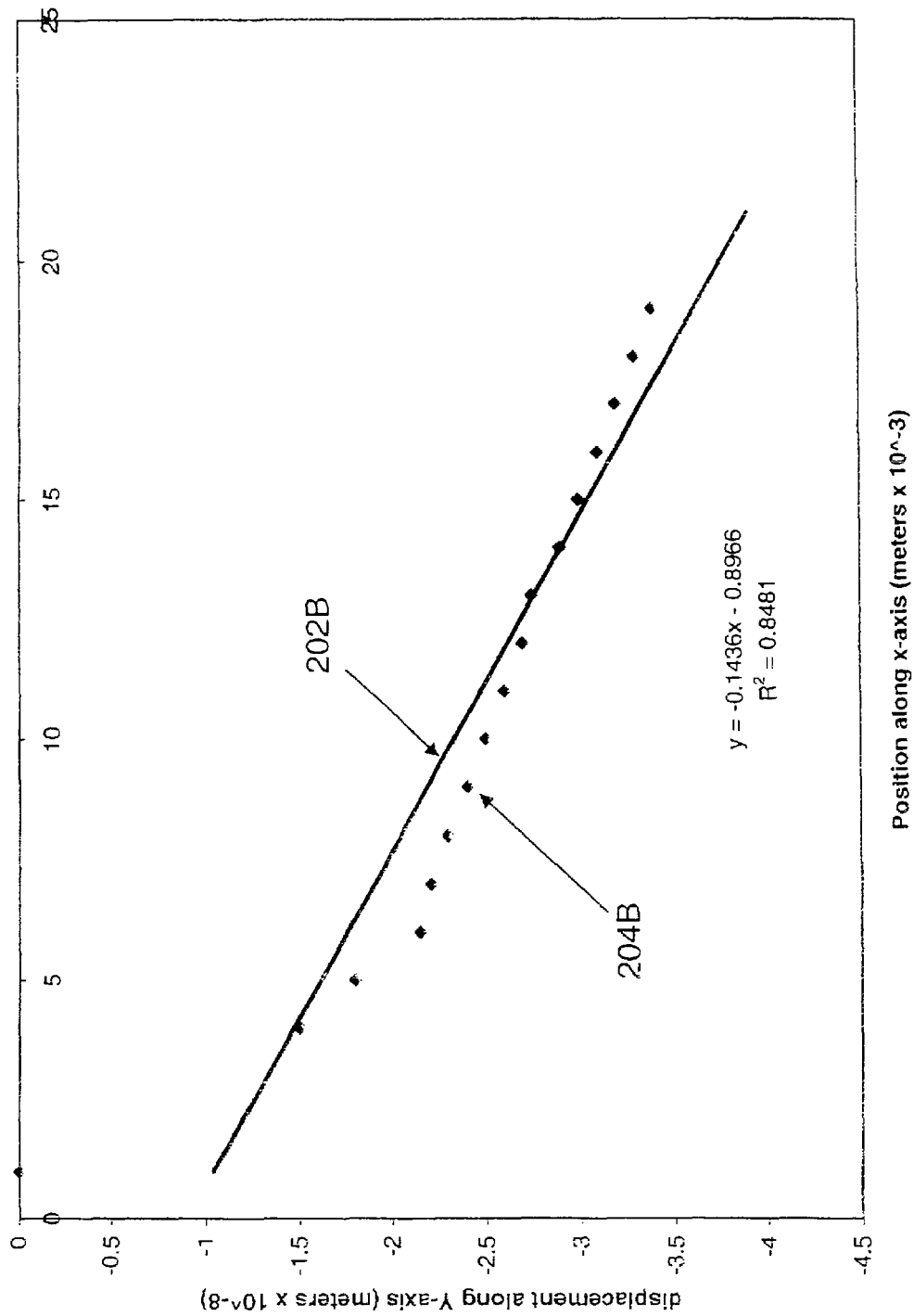

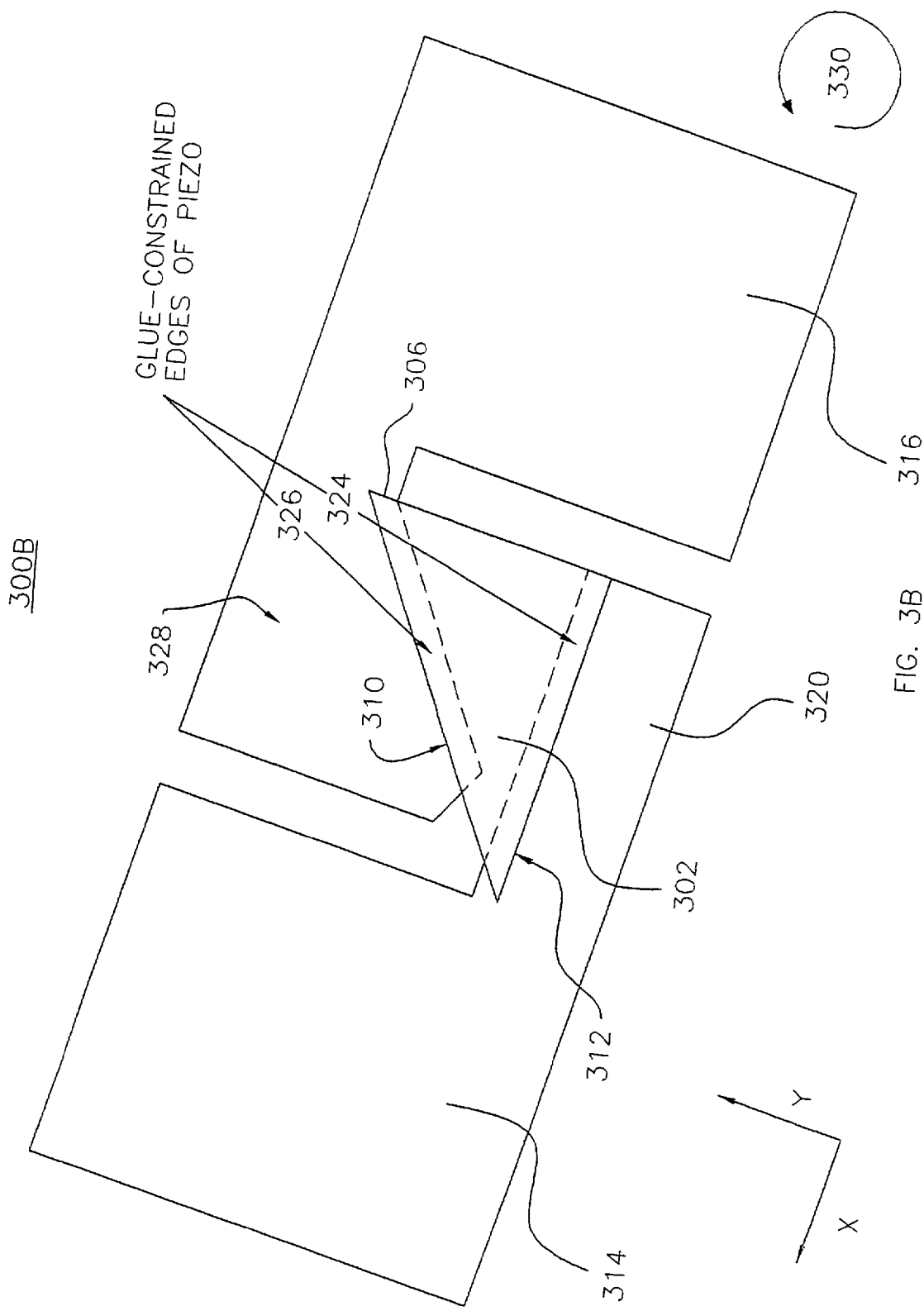

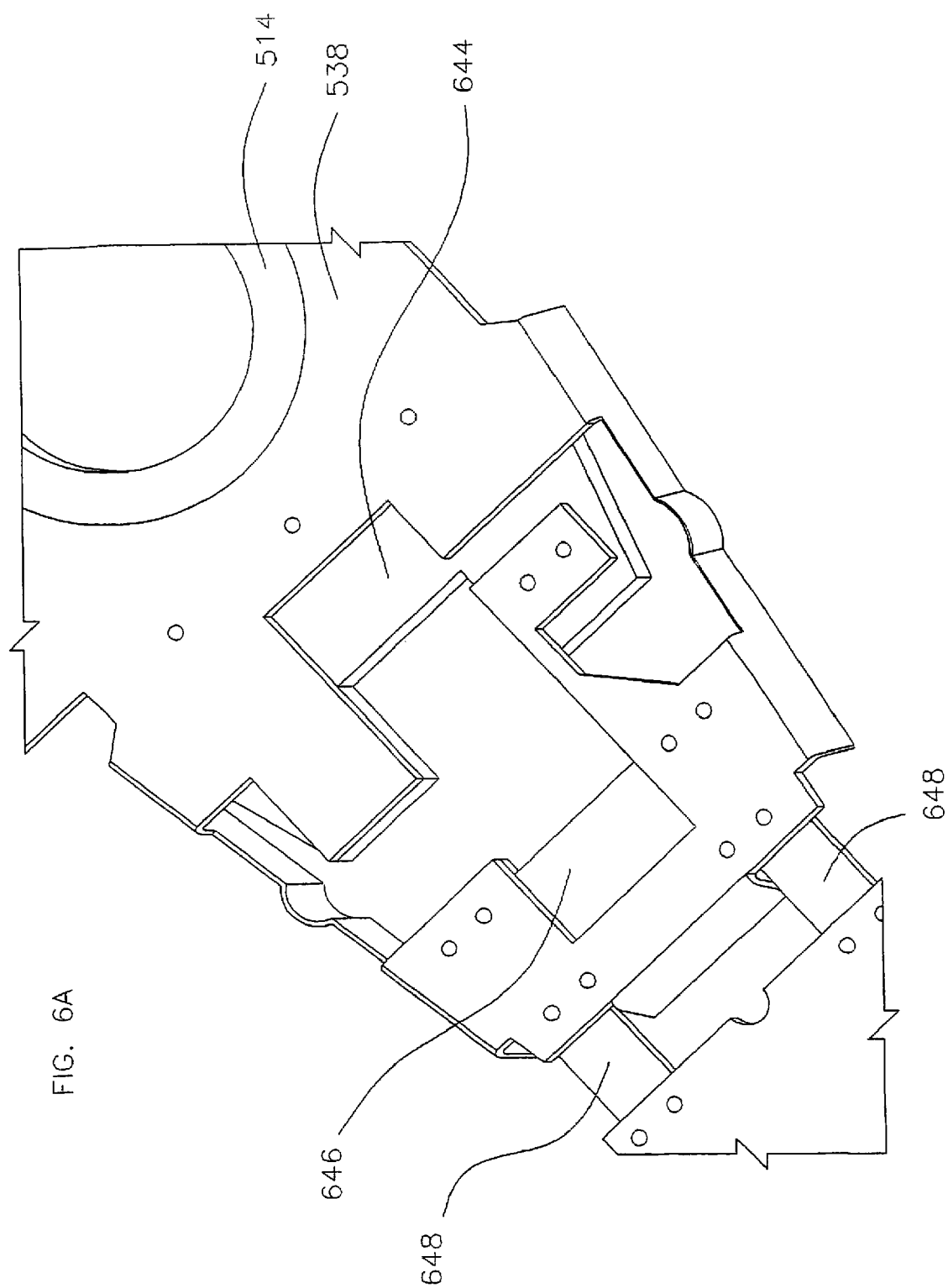

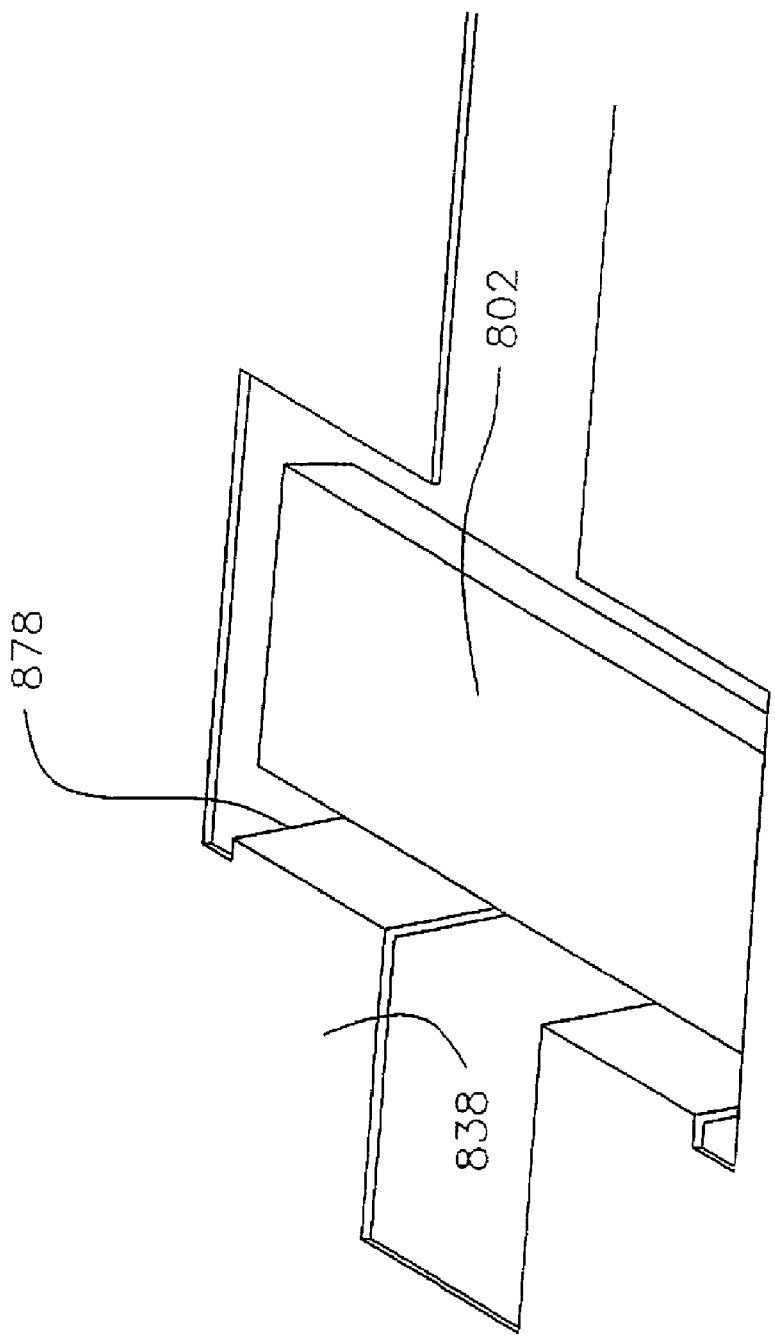

SUSPENSION ASSEMBLY HAVING RECESSED ACTUATOR WITH SIMPLIFIED LEAD CONNECTION

CROSS-REFERENCE TO RELATED APPLICATION

This is a continuation of application Ser. No. 11/282,305, filed Nov. 18, 2005 now U.S. Pat. No. 7,595,965. The entire contents of this application are hereby incorporated by reference.

BACKGROUND

1. Field of the Invention

The present invention relates generally to suspension systems for hard disk drive systems. More specifically, the present invention relates to piezoelectric micro-actuators for hingeless actuation of loads in hard disk drive head suspension assemblies.

2. Related Art

Microactuators have many applications. For example, in the magnetic disk drive industry, piezoelectric (hereinafter "piezo") microactuators have become an attractive alternative to voice coil actuators, particularly in high-density applications. As industry trends have demanded higher density storage capabilities, piezo actuators have been more frequently employed in HDD systems because they allow for more precise radial positioning of the head with respect to the disk.

A conventional suspension assembly in an HDD comprises a base plate, load beam, flexure, one or more actuators, a slider, and circuit elements for energizing the actuator. In order to achieve the desired angular motion at the head, or load end, of the assembly, most HDD piezo microactuator designs rely on hinges to convert the linear motion of a piezo-actuator into angular motion. One conventional method of achieving higher precision is to design a head positioner having dual piezo actuators, which work in a push-pull mode about one or more hinges that define the center of rotation. Numerous examples exist in the prior art, such as in U.S. Pat. No. 6,046,888; U.S. Pat. No. 6,157,522; and U.S. Pat. No. 6,331,923. In other designs, a single piezo element is used, such as in U.S. Pat. No. 6,522,050 and U.S. Pat. No. 6,760,196. In single-piezo actuator designs, reliance on hinges to effect rotation is even more pronounced. In general, in all of the suspension assemblies described in the foregoing patents, the coupling of a hinge to the piezo actuator adds to the manufacturing complexity.

Effecting multiple piezo lead connections can be troubling, and in any case burden the manufacturing process with additional steps. This is especially true in dual-piezo configurations having flexible circuits that require stitch bonding or lengthy tail weaving. These techniques entail excessive delicate manual operations to weave, fixture, and tack solder the connections. In typical prior art designs, the piezo is mounted to the upper surface of the load beam (the surface opposite the air bearing), while the flex on circuit (FOS) runs beneath the load beam. This arrangement requires an FOS having an extended tail portion woven to a soldering location on the upper surface of the piezo, and causes manufacturing difficulties: extended tail weaving in this fashion undesirably reduces assembly packing density; installing solder bumps on the flexure adds significant fabrication cost; and the thermal soldering operation itself can degrade piezo performance as it often exceeds the Curie temperature of the actuator.

Dual actuator designs cause performance tradeoffs as well. HDD suspensions are designed to possess high bending, torsion, and sway frequencies to achieve good dynamic performance characteristics. However, inclusion of a hinge or a second actuator into the suspension tends to degrade its frequency response. This is typically a result of weak coupling properties of the piezo-hinge structure at both the front and distal ends of the suspension. Addition of piezo mass also contributes to the degradation. In some prior art, stiffeners are provided to strengthen the coupling of the distal end, but this adversely affects actuator performance by reducing the attainable stroke levels. Stiffeners also introduce windage-induced turbulence on the head, due to their geometric features being out of plane. Other solutions include increasing the flexibility of the hinge, and moving the hinge closer to the actuator body. But these techniques concentrate more stress on the hinges, leading to early fatigue and material failure.

In view of the foregoing, there is an ongoing need to improve the performance and manufacturability of microactuators in disk drive suspension systems.

SUMMARY

Various embodiments of the present invention provide systems and methods employing a piezo microactuator for effecting hingeless rotational actuation of HDD heads. In one embodiment, a head suspension assembly comprising a baseplate and a rotatable load employs a planar right-triangular piezo microactuator for coupling the baseplate to the load. The piezo microactuator is configured to expand, responsive to an excitation voltage, with greater magnitude in a first direction along one leg of the triangle than in a second direction along another leg that is normal to the first direction. This results in an angular movement of the hypotenuse, imparting rotational motion to the load. In other embodiments, the microactuator may be located anywhere between the baseplate and slider, for example, between stator and rotor portions of the baseplate, between the baseplate and a load beam, on a load beam spring area, between a load beam and a flexure, or between a load beam and a slider.

In another aspect of the invention, an upper surface of a piezo microactuator is grounded to a bottom surface of a load beam or baseplate to facilitate routing an electrical trace to the suspension assembly. In one embodiment, the grounding surface of the load beam may be raised to accommodate the microactuator such that the bottom lead connection surface of the microactuator and the unraised bottom surface of the load beam lie in a common plane. This allows the trace to run along the same surface on which the microactuator lead connection is made, thereby minimizing trace weave, and providing an accessible surface for TAB bonding the trace.

A further advantage of the invention enabled by grounding the microactuator to a raised bottom portion of a baseplate or load beam is the ability to position the microactuator such that its lead connection surface is closest to the slider. This facilitates routing the trace from the microactuator lead connection to the read/write head. Other advantages of a suspension assembly equipped with a microactuator according to the invention include better reliability through elimination of mechanical hinges and stiffeners, greater packing density, minimal tail weaving, fewer fabrication steps, less expensive manufacturing, higher structural gain amplification, higher sway mode and shock resistance, no dimple friction, less windage, and the ability to position the actuator closer to the gimbal.

Related systems, methods, features and advantages of the invention or combinations of the foregoing will be or will become apparent to one with skill in the art upon examination of the following figures and detailed description. It is intended that all such additional systems, methods, features, advantages and combinations be included within this description, be within the scope of the invention, and be protected by the accompanying claims.

BRIEF DESCRIPTION OF THE DRAWINGS

Preferred embodiments of the invention will hereinafter be described in conjunction with the appended drawings provided to illustrate and not to limit the invention. The components in the figures are not necessarily to scale, emphasis instead being placed upon illustrating the principles of the invention. In the figures, like reference numerals designate corresponding parts throughout the different views.

FIG. 2A is a graph displaying results of a finite element analysis of the actuator of FIG. 1, showing displacement of the piezo triangle before and after excitation.

FIG. 2B is a graph depicting the Y-directional displacement of the actuator of FIG. 1 for points on the piezo triangle lying along the X-axis.

FIG. 3B shows another embodiment of the invention, illustrating one method for coupling a piezo microactuator between a fixed base and a load.

FIG. 6A shows an isometric view of one embodiment of a hingeless microactuating system according to the invention prior to mounting the piezo actuator.

FIG. 8B shows a bottom isometric view of the configuration of FIG. 8A.

DETAILED DESCRIPTION

In accordance with the objectives of the invention set forth above, preferred embodiments are now described in further detail, which, when read in conjunction with the claims and drawings, give broader meaning and scope to the spirit of the invention.

As utilized herein, the term "piezo" means any piezoelectric material, including piezoceramics, piezotransducers (PZT) and all other compounds that exhibit the piezoelectric effect.

As utilized herein, terms such as "about" and "substantially" and "approximately" are intended to allow some leeway in mathematical exactness to account for tolerances that are acceptable in the trade, or that would otherwise encompass a functionally equivalent variation. Accordingly, any deviations upward or downward from any value modified by such terms should be considered to be explicitly within the scope of the stated value.

The present invention discloses a piezo microactuator for rotational actuation of loads on HDD head suspension assemblies. An assembly configured according to the teachings herein can effect rotational motion of the head exclusively by means of the piezo microactuator and without the assistance of mechanical hinges. Alternatively, a single piezo microactuator may function as a dual suspension by coupling to dual hinges, thereby eliminating the need for two microactuators. Configuring a head suspension with a microactuator according to methods disclosed herein greatly simplifies the manufacturing process, and provides a better performing, more reliable, and higher shock resistant suspension assembly.

Figure 1:
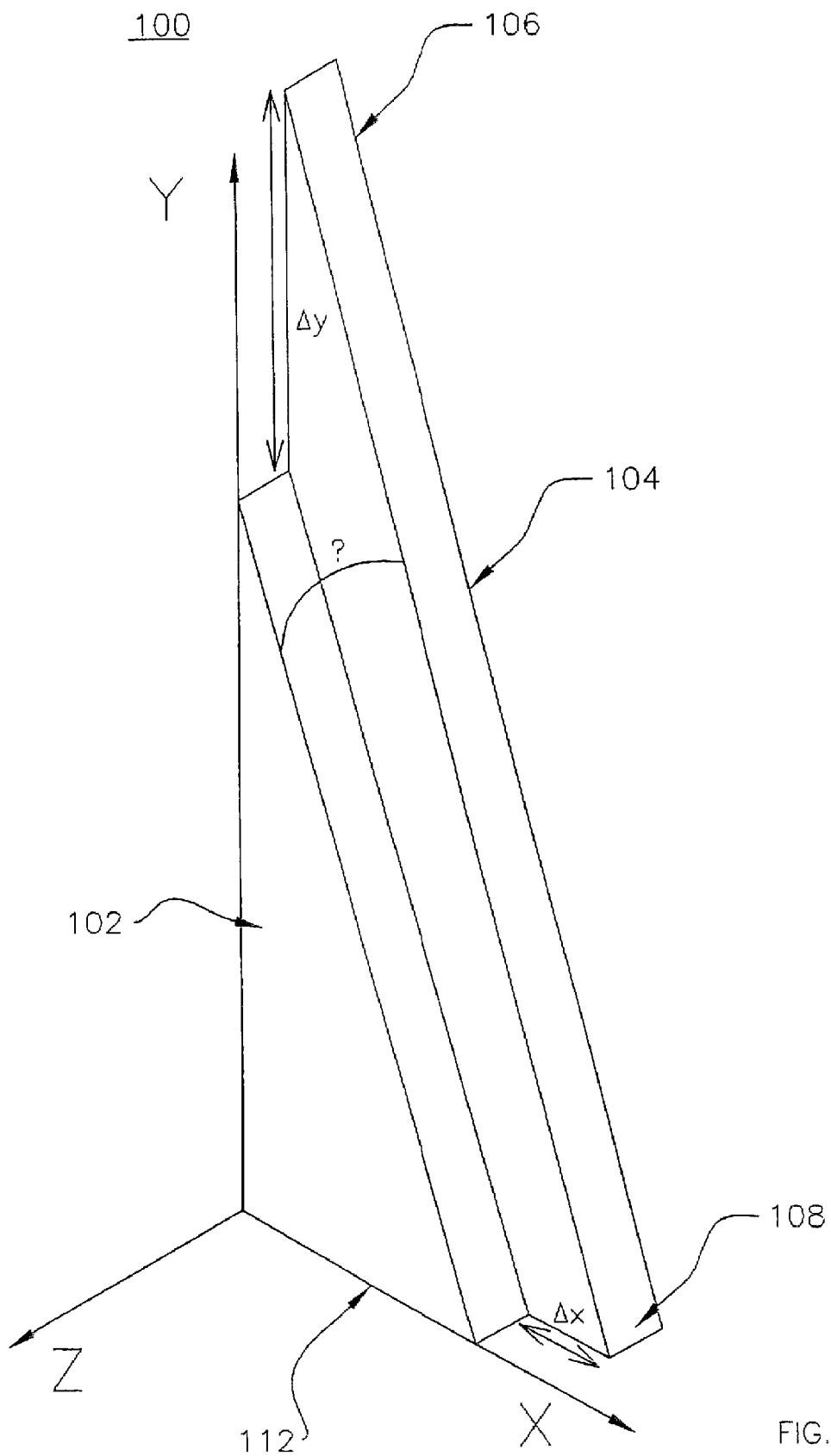
FIG. 1 illustrates a triangular-shaped piezo microactuator according to one embodiment of the present invention.

With reference now to the drawings in detail, FIG. 1 illustrates a triangular-shaped piezo microactuator 100 according to one embodiment of the present invention. Microactuator 100 is formed from a single piece of piezoelectric material, preferably a piezoceramic compound that can be formed to a desired geometry. Microactuator 100 is activated to establish a polling axis coincident with the Z axis, as shown in the figure. Viewed in the x-y plane, microactuator 100 has a substantially triangular shape. In the embodiment of FIG. 1, the shape comprises a right triangle having a hypotenuse and two substantially perpendicular legs, the short leg extending along the x-axis and a long leg extending along the y-axis. In a non-energized state, microactuator 100 has a minimal form 102. Upon application of sufficient voltage across its width, i.e., when a potential difference is applied in the z direction, microactuator 100 will expand to a maximal form 104. Conversely, upon removal of the voltage, microactuator 100 will contract to its minimal form 102. However, given the foregoing material properties and geometry, the magnitude of expansion, $\Delta y$, in the y-direction at corner 106 will be much greater than the magnitude of expansion, $\Delta x$, in the x-direction at corner 108.

A microactuator according to the present invention exploits this phenomenon by fixing the position of at least one leg, or edge of the triangle, thereby imparting rotational motion to another component suspended from the hypotenuse 110. In other words, hypotenuse 110 rotates in the x-y plane through a desired angle when a sufficient voltage is applied to opposing surfaces of the actuator. The voltage sufficient to effect this rotation is hereinafter deemed the excitation voltage. Thus, in this example, with microactuator 100 in minimal form 102, edge 112 is fixed, and an excitation voltage is applied. The piezoelectric effect causes hypotenuse 110 to rotate through angle θ as microactuator 100 expands to maximal form 104. In preferred embodiments, Δx and Δy are on the order of 0.005 to 0.010 microns.

FIG. 2A shows results from finite element modeling of a microactuator 100 having a height (along the y-axis) of 4.0 mm, a length (along the x-axis) of 2.0 mm, and a thickness (along the z-axis) of 0.1 mm. The line 202A represents the planar dimensions of the microactuator in a non-energized state, while the line 204A represents its dimensions after application of a 10.0 V excitation. A displacement plot for the y degree of freedom is shown at the bottom of the figure. As indicated in the plot, maximum deflection in the y direction occurs at corner 206.

This phenomenon is also illustrated in the graph of FIG. 2B. This figure depicts the y-directional displacement of microactuator 100 for points on the triangle lying along the x-axis. Here, solid line 202B represents y-directional displacement of the hypotenuse in a non-energized state, while dotted line 204B shows the displacement of discrete points during application of the excitation voltage. The graph clearly illustrates angular motion of the hypotenuse in the x-y plane, as y-directional displacement achieves a maximum near the origin, and a minimum at higher values of x.

Figure 3A:
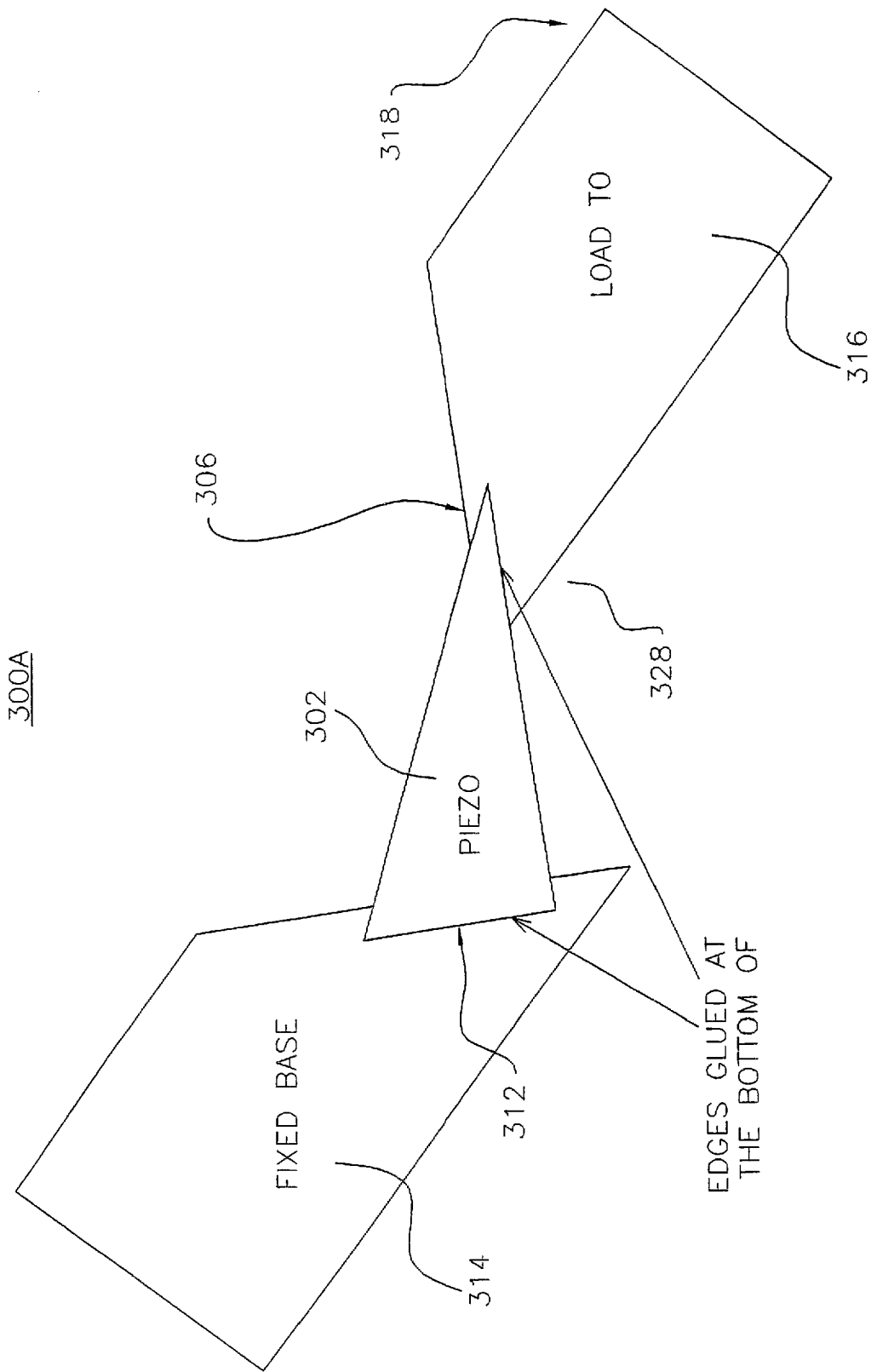
FIG. 3A illustrates one embodiment of a hingeless microactuator according to the invention, where the piezo is mounted between a fixed base and a load.

FIG. 3A shows a conceptual diagram of one embodiment of a microactuated head suspension assembly 300A employing a hingeless piezo actuator according to the invention. Assembly 300A comprises a fixed base 314, a piezo actuator 302, and a load 316. Base 314 represents a component of an HDD head assembly that is substantially stationary with respect to a rotatable suspended load 316. For example, base 316 may represent a metal baseplate or load beam. Piezo actuator 302 is fixed at proximal edge 312 to base 314. In one implementation, a bonding agent such as conductive epoxy bonds proximal edge 312 to base 314. In similar fashion, actuator 302 is coupled or bonded to a proximal end 328 of load 316 at or near a distal end 306 of actuator 302. In this embodiment, load 316 represents the free end of an HDD head suspension, i.e., a read/write head and slider, or a flexure, or a gimbal assembly. With assembly 300A so configured, application of the excitation voltage to actuator 302 results in rotation of load 316 substantially within the x-y plane with respect to base 314, as piezoelectric expansion causes corner 306 to displace angularly while edge 312 remains fixed to stationary base 314.

FIG. 3B shows another embodiment of the invention, assembly 300B that illustrates a different configuration for coupling a piezo microactuator between a fixed base 314 and a rotatable suspended load 316. Here, base 314 comprises an elongated section 320, running in the x direction, which provides a bonding location for proximal edge 312 of actuator 302. In this example, a bonding area 324 is established where edge 312 overlaps section 320. An adhesive or other bonding means may be applied in area 324 to fix edge 312 to base 314. Similarly, another bonding area 326 is established where edge 320 overlaps a distal end 328 of load 316. An adhesive bond in area 326 fixes edge 310 to load 316, and in this fashion, actuator 302 couples base 314 to load 316, enabling rotational actuation of load 316 with respect to base 314 upon application of the excitation voltage. In this embodiment, load 316 rotates substantially within the x-y plane in a counterclockwise direction 330.

Figure 3C:
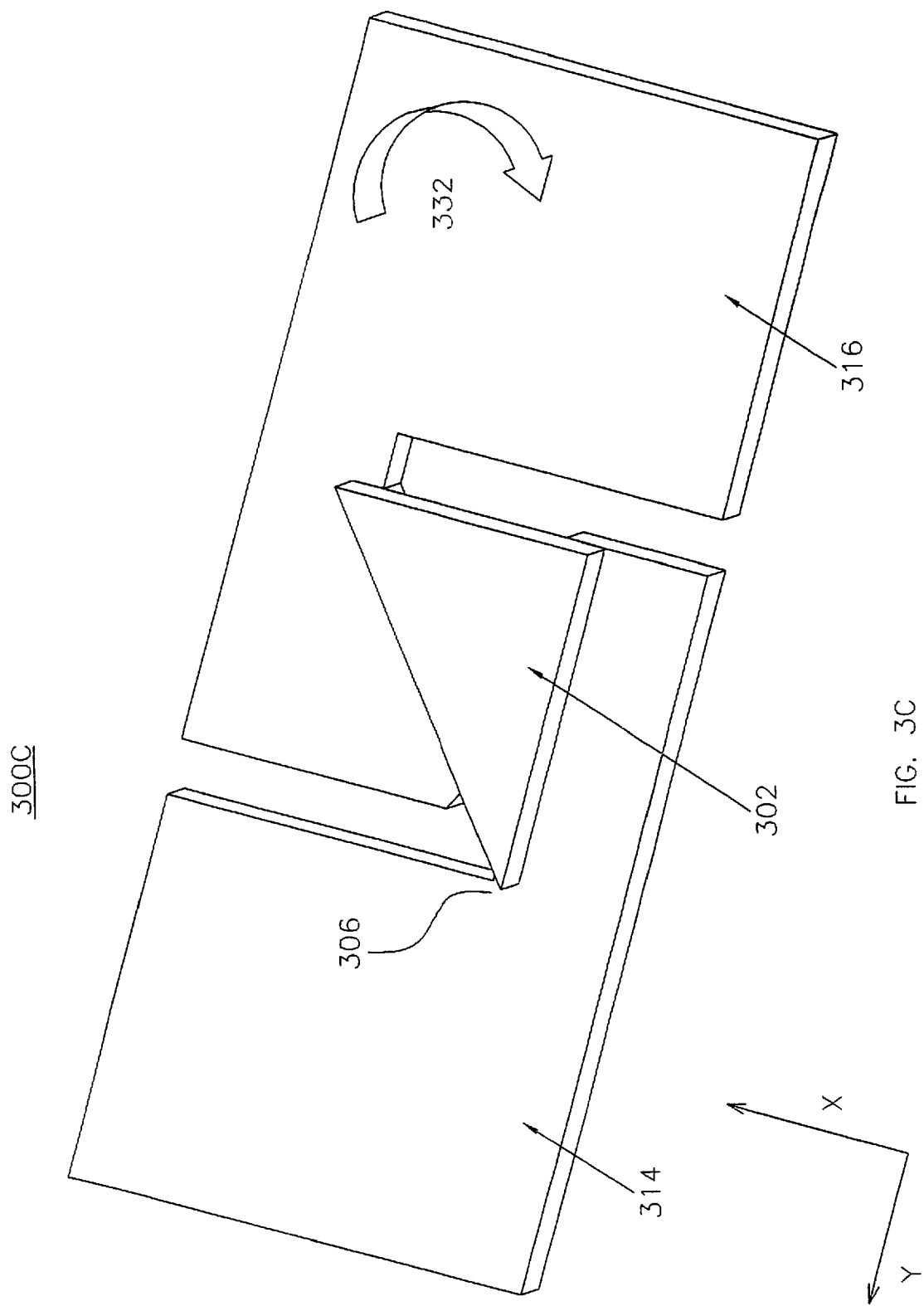
FIG. 3C illustrates another embodiment of a hingeless microactuator according to the invention.

FIG. 3C illustrates another embodiment 300C of a hingeless microactuator according to the invention. This embodiment is similar to 3B, except that corner 306 of actuator 302 is fixed to base (or stator) 314, which causes load (or rotor) 316 to rotate with respect to base 314 substantially within the x-y plane in a clockwise direction 332.

Figure 3D:
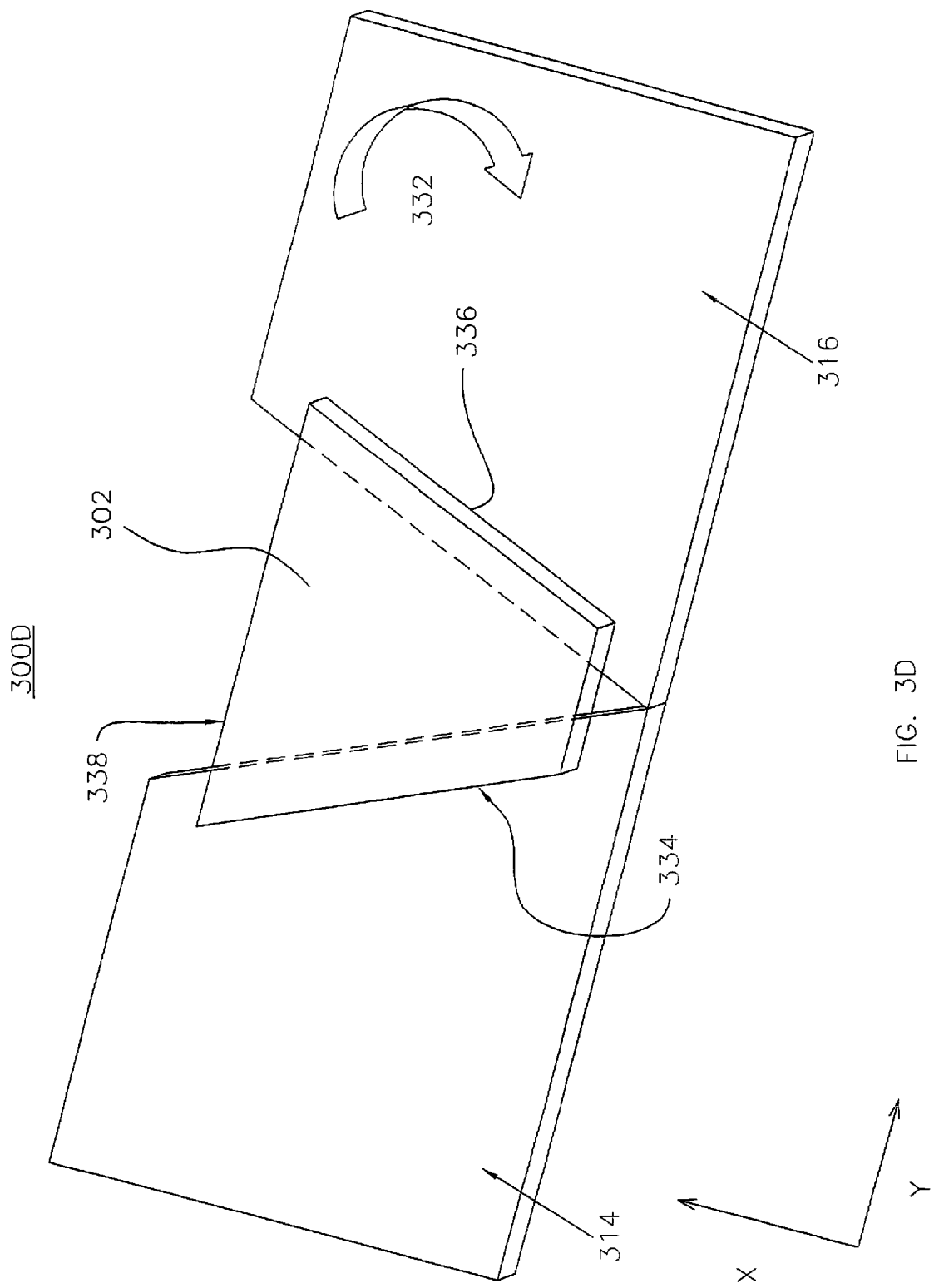
FIG. 3D illustrates another embodiment of a hingeless microactuator according to the invention.

FIG. 3D illustrates another embodiment 300D of a hingeless microactuator according to the invention. In this embodiment, piezo actuator 302 comprises a trapezoid coupling a stator 314 to a rotor 316. Opposing non-parallel edges 334 and 336 of actuator 302 bond to stator 314 and rotor 316, respectively. This geometry induces maximal expansion of actuator 302 in the y direction along edge 338, resulting in rotation of rotor 316 with respect to stator 314 substantially within the x-y plane in a clockwise direction 332.

Figure 4A:
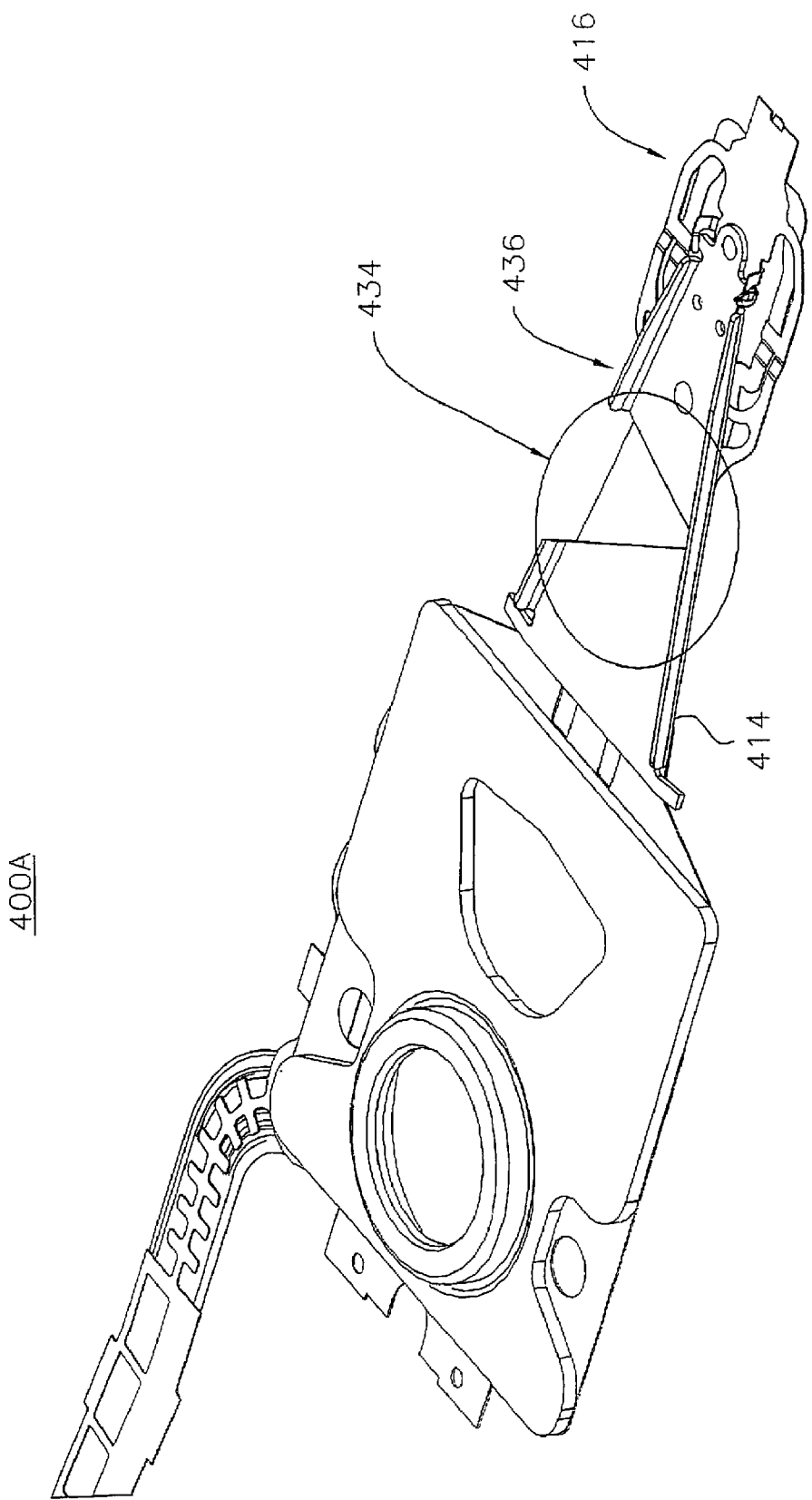
FIG. 4A shows one location for a microactuator on a load beam between a spring area and a gimbal, according to another embodiment of the invention.
Figure 4B:
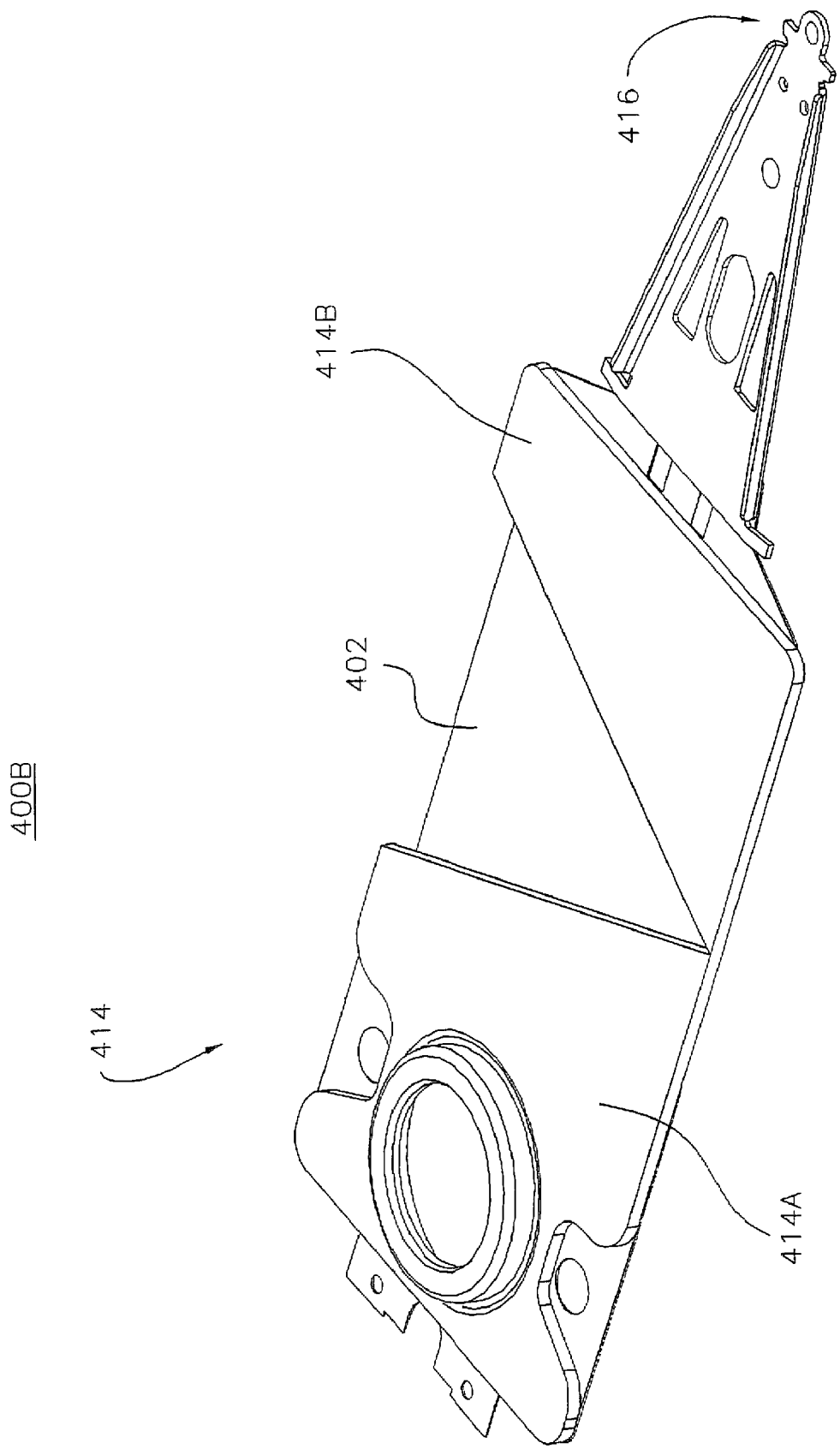
FIG. 4B shows another embodiment of the invention, where the microactuator is mounted on a baseplate having fixed and rotatable parts.

FIG. 4A shows a location 434, for a hingeless microactuator according to the invention, mounted in a head suspension assembly 400A. Location 434 is situated on a load beam 414 between a spring area 436 and a gimbal 416. In the embodiment shown, spring area 436 is integral to load beam 414. In other embodiments, spring area 436 may comprise a separate component, such as a flexure, coupled to load beam 414 through a piezo microactuator. In embodiment 400B shown in FIG. 4B, baseplate 414 comprises a stator 414A and a rotor 414B. A piezo microactuator 402 is mounted to baseplate 414 between stator 414A and rotor 414B. Load 416 is coupled to rotatable part 414B; therefore rotation of part 414B from expansion of microactuator 402 causes rotation of load 416 with respect to fixed part 414A.

Figure 5:
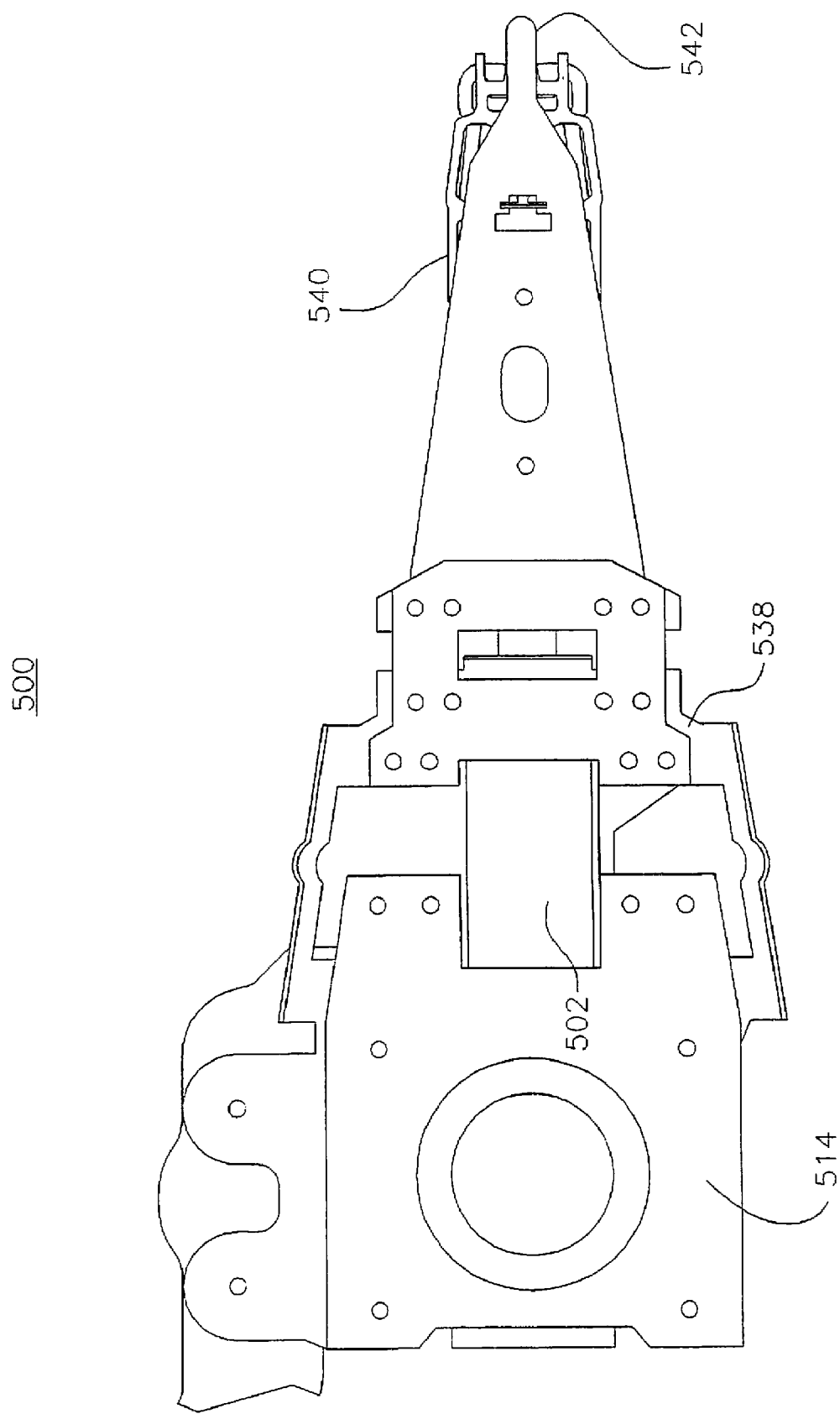
FIG. 5 shows a top view of a suspension assembly configured with one embodiment of a hingeless microactuator according to the invention.

FIG. 5 shows a top view of a microactuated suspension assembly 500 according to another embodiment of the invention. Assembly 500 includes a baseplate 514, a load beam 538, a flexure 540, and a slider 542. Baseplate 514 provides stationary support for the assembly. As shown in FIG. 5, a piezo microactuator 502 configured according to the invention is coupled between baseplate 514 and load beam 538. Flexure 540 is coupled to a distal end of load beam 538, and slider 542, bearing a read/write head (not shown), is coupled to a distal end of flexure 540. Thus, the read/write head is mechanically linked to baseplate 514 through microactuator 502, and therefore an excitation voltage applied to microactuator 502 will cause displacement of the read/write head.

In order to properly energize microactuator 502 to effect this displacement, a means for applying a voltage differential across the width of the piezo is provided. With reference now to FIG. 6A, one such means is described. FIG. 6A shows an isometric view of the underside of assembly 500, prior to mounting microactuator 502. A first mounting surface 644 functions as a grounding surface and is provided on the bottom surface of baseplate 514 at its distal end. Surface 644 is exposed through a cutout in load beam 538, as shown. A second mounting surface 646 is provided through another cutout in load beam 538, which, in this example, provides a means for coupling microactuator 502 to dual hinges 648. This allows for dual suspension action using a single piezo actuator. In other embodiments, second mounting surface 646 is provided on load beam 538. In one implementation, a second mounting surface 646 may be provided on a load beam between the baseplate and a spring area located on the load beam.

Figure 6B:
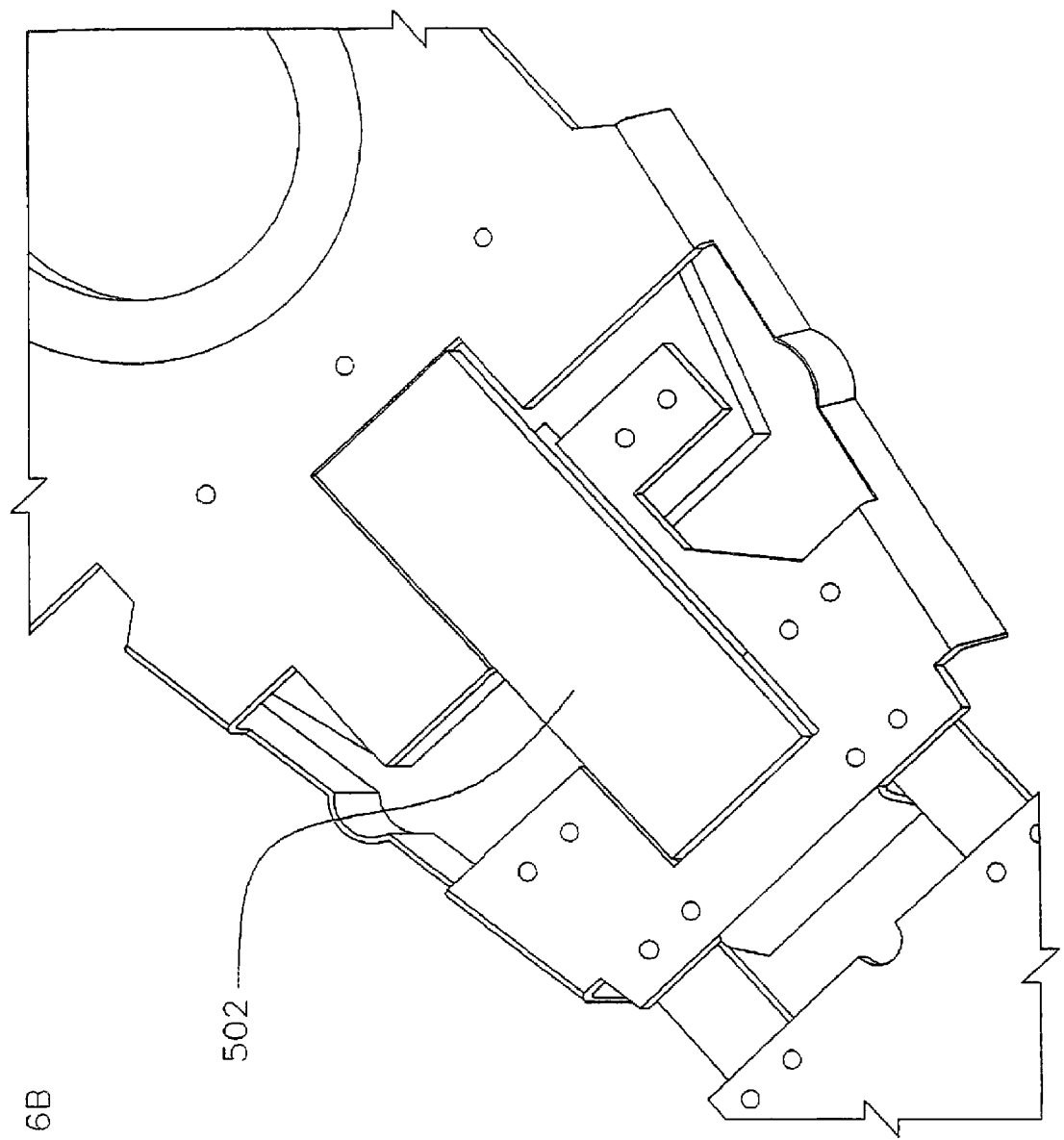
FIG. 6B shows an isometric view of the embodiment of FIG. 6A after mounting the piezo actuator.

In another embodiment, the thickness of microactuator 502 is substantially equivalent to the thickness of load beam 538. This equivalence preserves a planar surface on the underside of the assembly after mounting microactuator 502 to the first and second mounting surfaces 644 and 646, as shown in FIG. 6B. Microactuator 502 is preferably bonded to one or both of these surfaces using a conductive bond, such as silver epoxy, in order to electrically ground the top surface of microactuator 502 to baseplate 514.

Figure 6C:
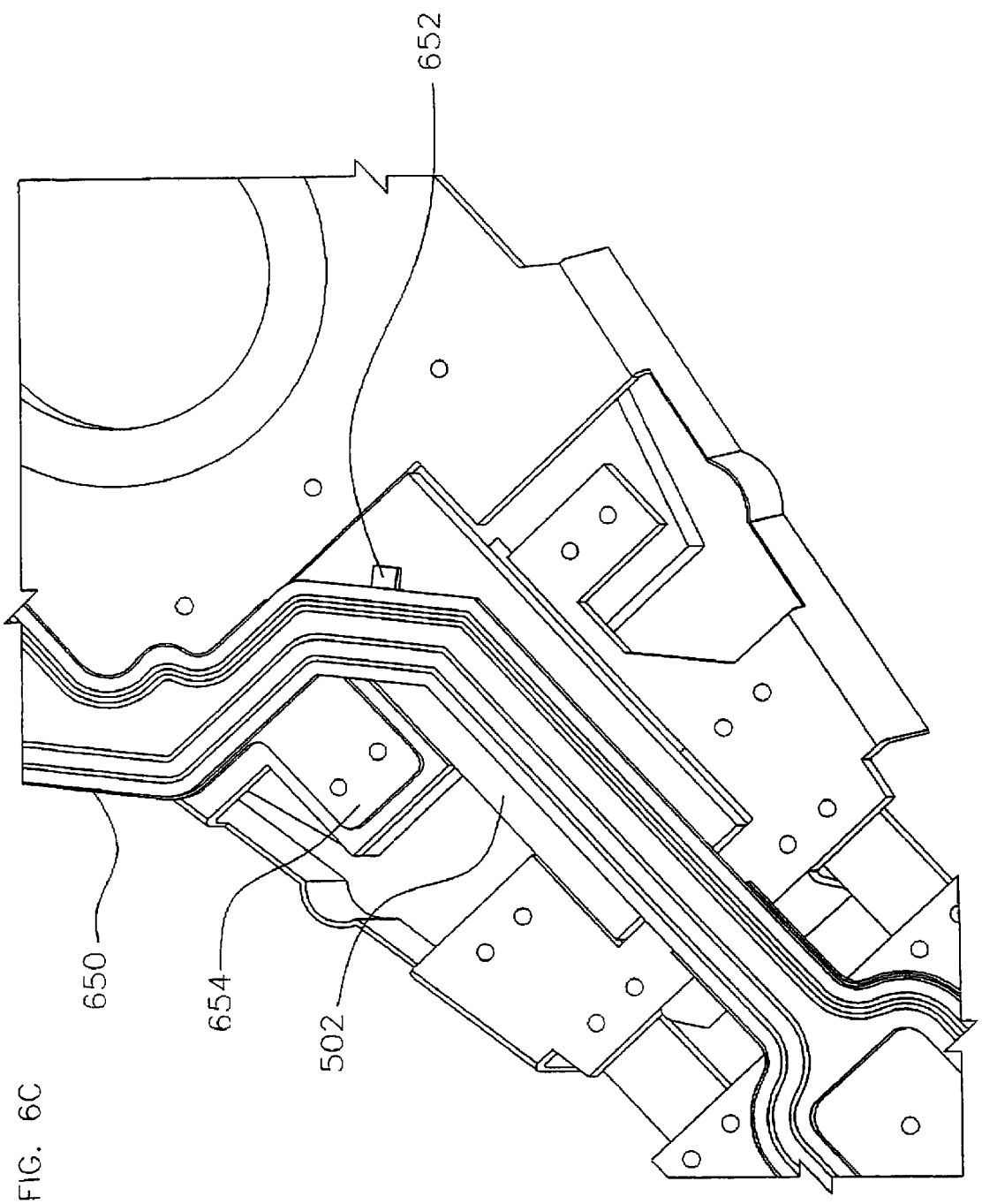
FIG. 6C shows an isometric view of the embodiment of FIG. 6A after attaching the electrical trace and soldering the piezo actuator.

Maintaining a planar surface on the underside of assembly 500 facilitates the routing of an electrical trace to the microactuator and slider. FIG. 6C illustrates assembly 500 after attaching electrical trace 650 and soldering an electrical lead 652 to microactuator 502. Electrical trace 650 may comprise any conventional flexible circuit or FOS known in the art, and is further configured with a trace attachment portion 654 sized to mate with a corresponding mounting location on load beam 538. Thus, trace attachment 654 may be welded to load beam 538 at a single location 652. Lead 652 may be affixed to the non-grounded, or positive surface of microactuator 502 by solder bump or ultrasonic TAB bonding, thereby providing a means for applying the excitation voltage. This arrangement places trace 650 and the connection for lead 652 in a common plane, thereby advantageously eliminating excessive tail weaving. In a preferred embodiment, the common plane coincides with the bottom planar surface of load beam 538. Further advantages of this configuration include a reduction in the number of soldering points, an increased packing density, and overall, a more simplified manufacturing process.

Figure 7A:
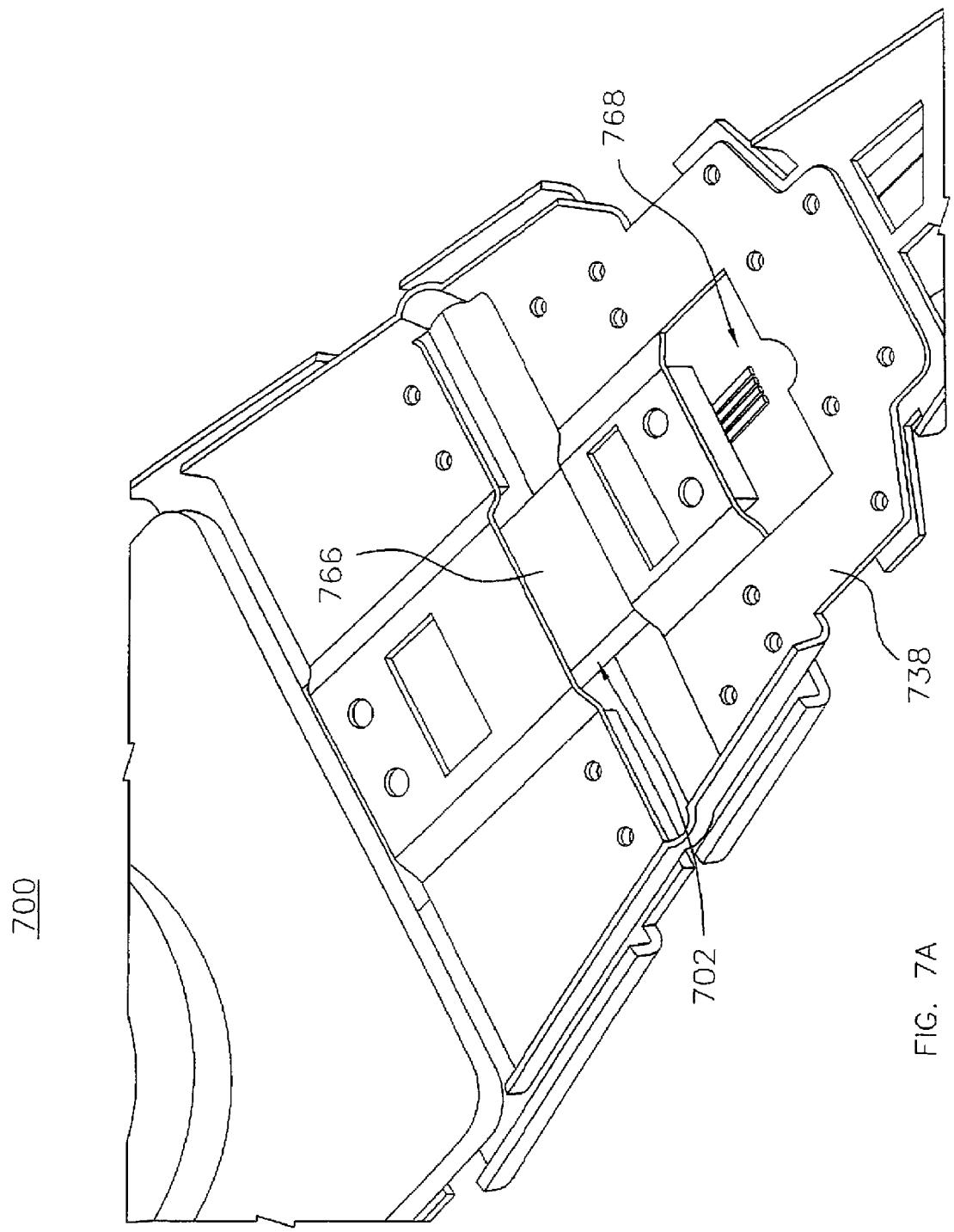
FIG. 7A shows another embodiment of a hingeless microactuating system according to the invention having a piezo actuator grounded to the underside of the assembly.

FIG. 7A shows a top isometric view of another embodiment of a hingeless microactuating system according to the invention. As in foregoing embodiments, piezo microactuator 702 has a generally planar form, comprising two surfaces: a grounding surface, and a lead connection surface opposite the grounding surface. System 700 provides a means for grounding one surface of a microactuator 702 to the underside of the suspension assembly in such a way that the microactuator surface closest to the slider is the lead connection surface. In the figures, the top surface 766 of microactuator 702 is the grounding surface, and the lead connection surface is the bottom surface 776 from which electrical leads 768 extend.

Figure 7B:
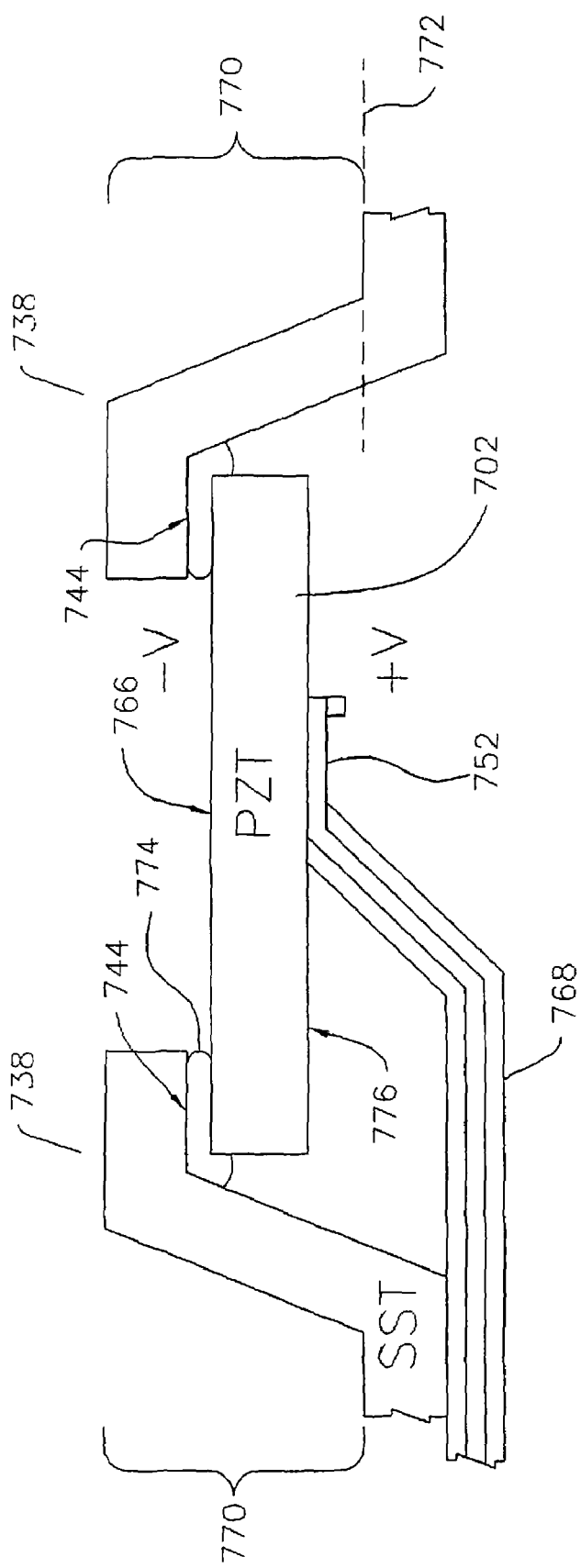
FIG. 7B shows a connection detail for another embodiment of the invention.

FIG. 7B is a cross-sectional view of an embodiment similar to system 700, showing electrical connections in greater detail. Load beam 738 includes one or more raised portions 770 that are elevated above the load beam plane at line 772. Each raised portion 770 provides, on its underside, a grounding location 744 for bonding to the grounding surface 766 of microactuator 702. A conductive bonding agent 774 between surfaces 744 and 766 effects this bond. By this mounting arrangement, microactuator 702 is elevated above plane 772 to such an extent that the lead connection surface 776 lies in closer proximity to the slider (or load end), than grounding surface 766. This further simplifies the routing of leads 768 from trace 650 to the slider, since it allows the trace to run along plane 772. Lead connection 752 may also depart the trace in plane 772, making it more easily accessible for TAB bonding to lead connection surface 776. In another embodiment, the elevation of raised portion 770 is limited to allow lead connection surface 776 to lie in the same plane with the unraised portion, or bottom surface, of load beam 738.

Figure 8A:
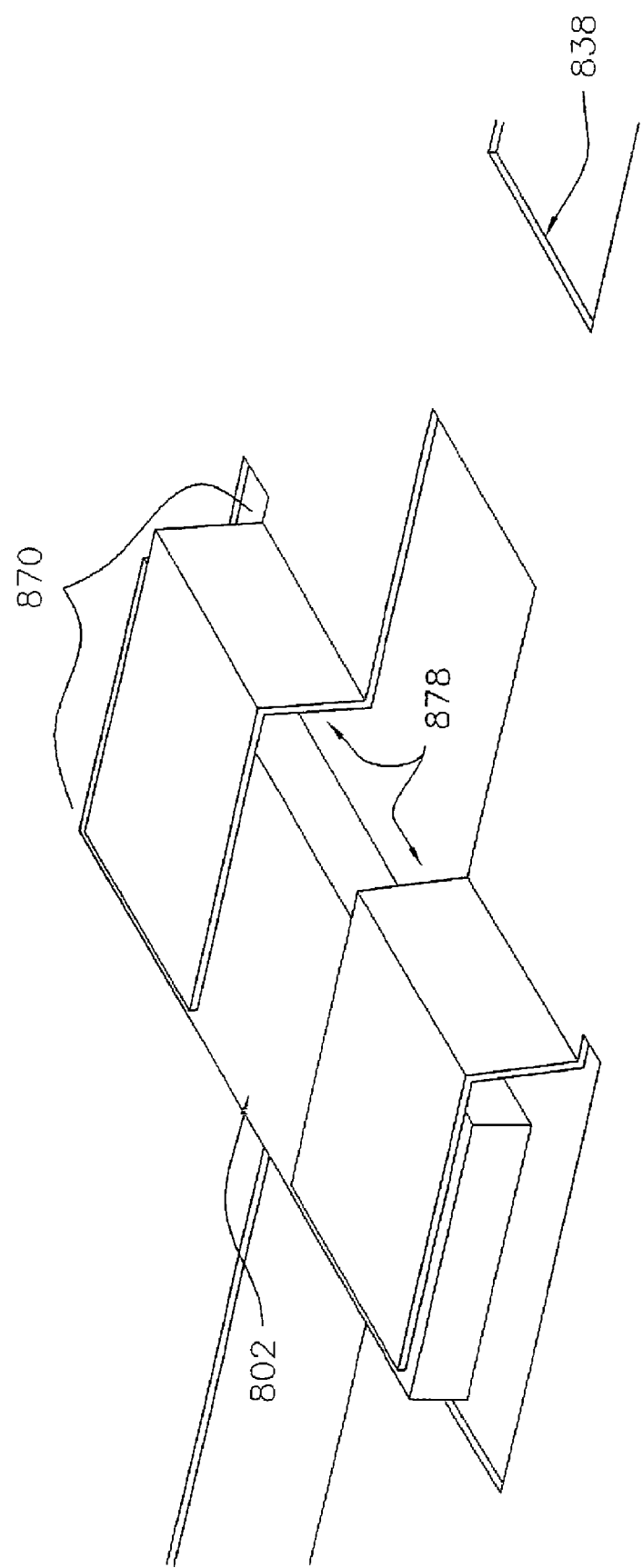
FIG. 8A shows a top isometric view of a dual single-wing mounting configuration for a piezo actuator.
Figure 8C:
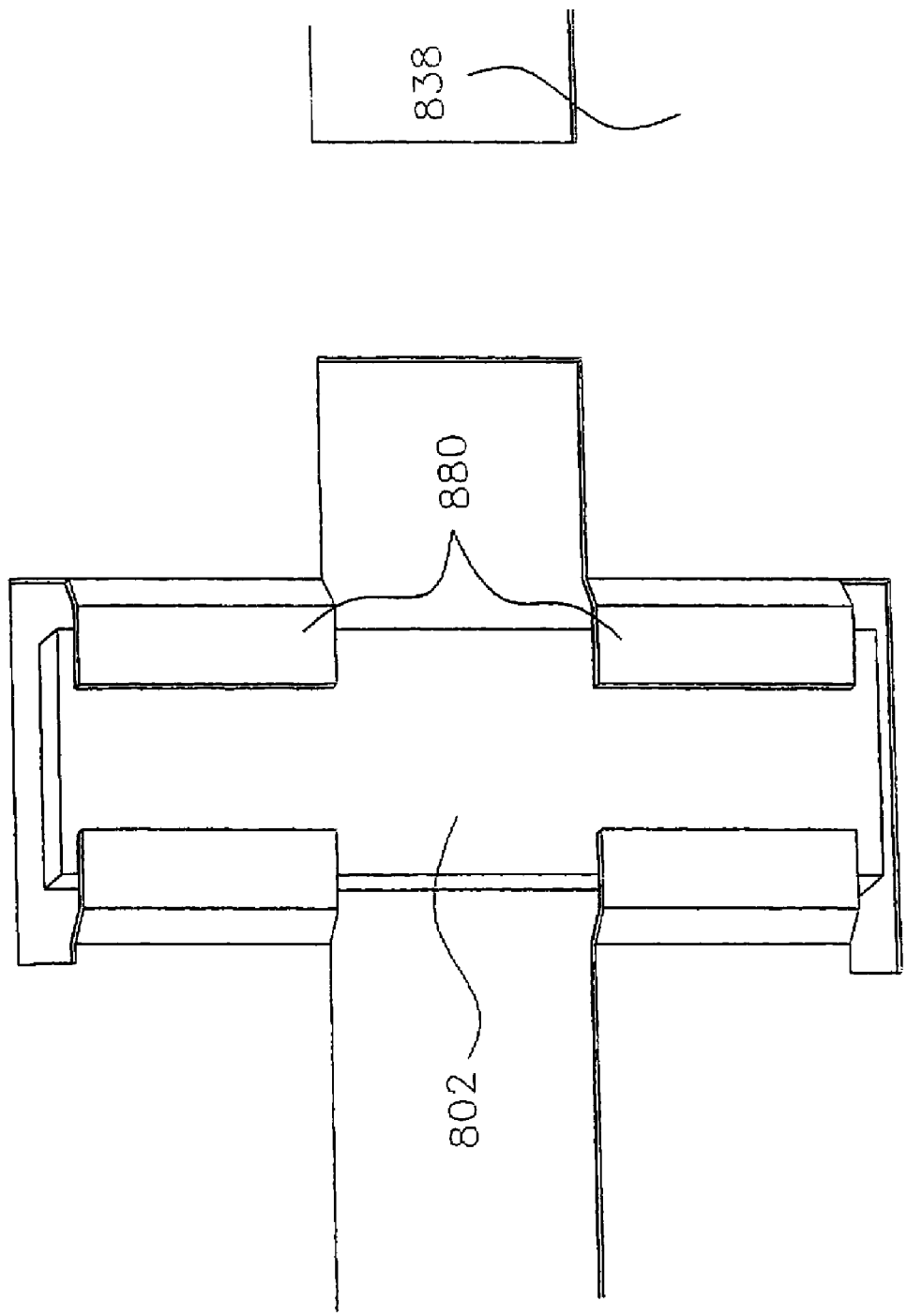
FIG. 8C shows an isometric view of a dual double-sided-wing mounting configuration for a piezo actuator.
Figure 8D:
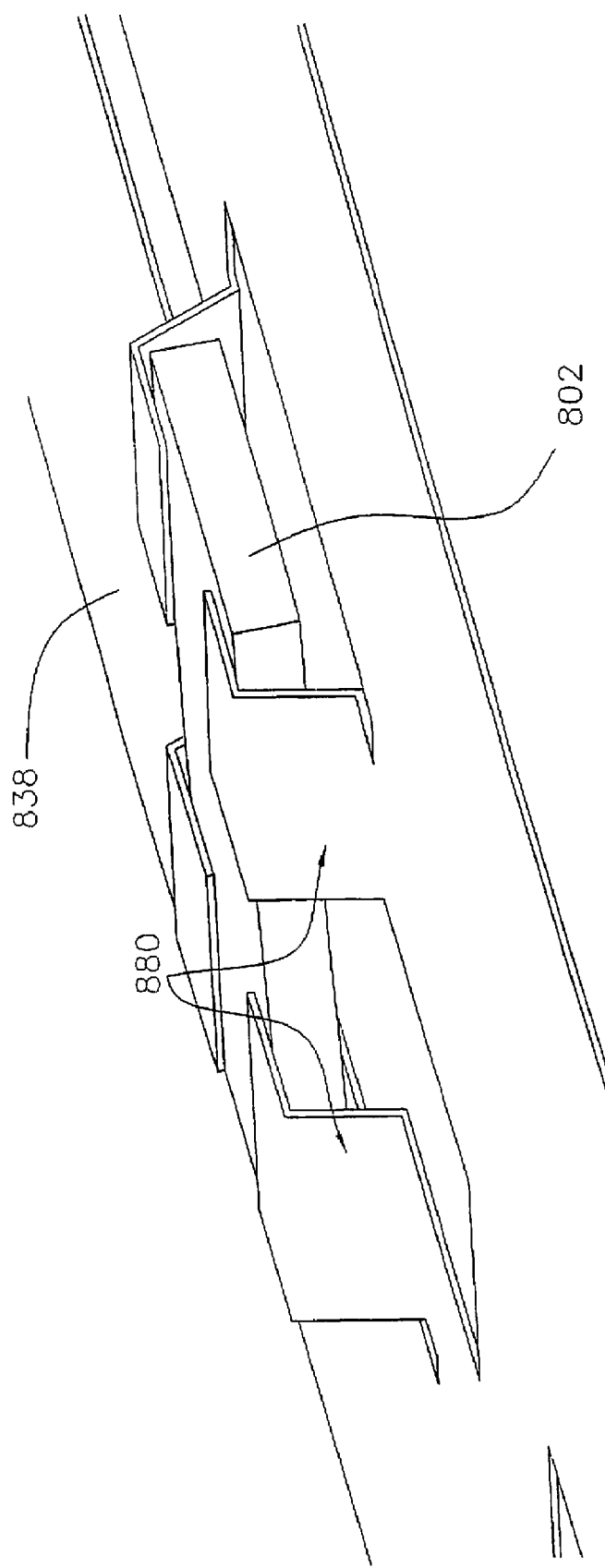
FIG. 8D shows a side isometric view of the configuration of FIG. 8C.

FIGS. 8A-8D illustrate different embodiments of a raised portion 870 of load beam 838 in a microactuation system according to the invention. FIG. 8A shows a top isometric view of a dual single-wing mounting configuration for a microactuator 802. Each single wing 878 comprises an L bracket fixed at one end to load beam 838, and provides a grounding surface for microactuator 802 along its wing. FIG. 8B shows a bottom isometric view of the dual single-wing configuration. FIG. 8C shows an isometric view of a dual double-sided wing mounting configuration for a microactuator 802. Each double-sided wing 880 comprises a pair of opposing single-wings, as shown. FIG. 8D shows a side isometric view of the dual double-sided wing arrangement.

Figures 9A, 9B:
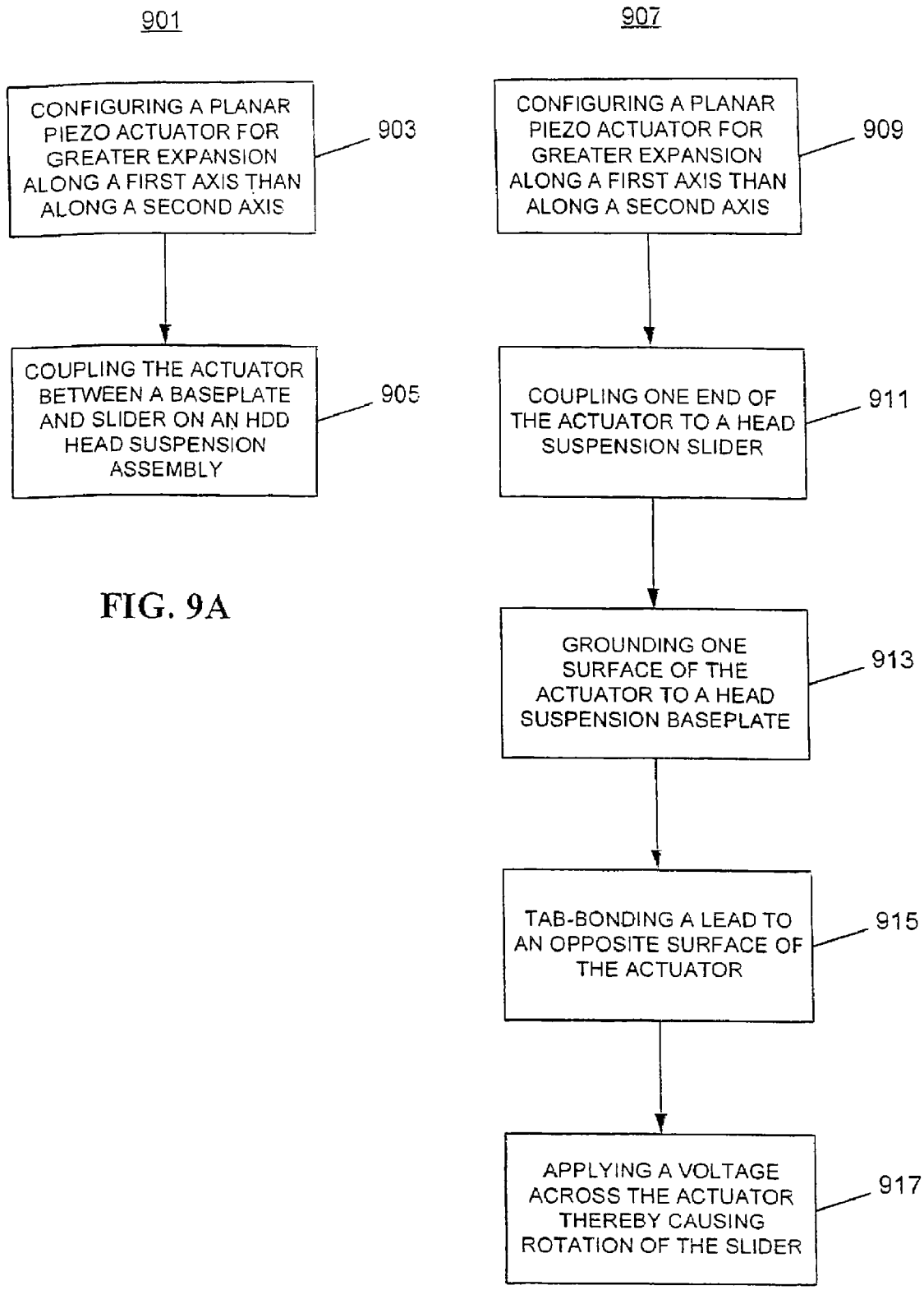
FIG. 9A illustrates one embodiment of a method for manufacturing a hingeless microactuator according to the invention.
FIG. 9B illustrates a method of rotating a slider by means of a hingeless microactuator according to the invention.

FIG. 9A illustrates one embodiment of a method 901 for manufacturing a hingeless microactuator according to the invention. This method comprises two main steps. The first step is step 903, which comprises configuring a planar piezo actuator such that it exhibits greater expansion along a first axis than it does along a second axis that is substantially perpendicular to the first axis, upon application of an excitation voltage. Configuring in this case means making or causing to be made, piezo microactuators having the proper polling axis and geometry to cause angular displacement of coupled loads when energized. The microactuator may be configured in any form consistent with, or substantially functionally equivalent to, the teachings and suggestions in any of the foregoing system embodiments. The second and final step of method 901 is step 905, which comprises coupling the actuator between a baseplate and a slider on an HDD head suspension assembly. Additional manufacturing steps may be added, such as including a lead connection surface on the microactuator, and including a grounding surface opposite the lead connection surface. Taken to a higher level of assembly, manufacturing steps according to the invention may also include grounding the microactuator to a head suspension assembly such that the actuator surface closest to the slider is the lead connection surface. Other manufacturing techniques disclosed above in the various system embodiments may also be incorporated as method steps.

FIG. 9B illustrates one embodiment of a method 907 according to the invention for rotating a slider by means of a hingeless microactuator. In the initial step 909, the method begins by configuring a planar piezo actuator for greater expansion along a first axis than along a second, perpendicular axis. This step is identical to step 903. In the next step, 911, the method comprises coupling one end of the actuator to a head suspension slider. Coupling in this case means mechanically and/or electrically linking the actuator to the slider. Next, step 913 provides for electrically grounding one surface of the actuator to a head suspension stator or baseplate, as in any of the embodiments previously described. Then, step 915 comprises TAB-bonding an electrical lead to an opposite surface of the actuator. In one implementation of method 907, the electrical lead extends from a trace circuit, and the trace circuit and TAB bond area lie in a common plane. The final step 917 comprises applying a voltage across the actuator thereby causing rotation of the slider as a result of the piezoelectric effect.

While various embodiments of the invention have been illustrated and described, it will be apparent to those of ordinary skill in the art that many more embodiments and implementations are possible that are within the spirit and scope of this invention. Accordingly, the invention is not to be restricted except in light of the attached claims and their equivalents.

What is claimed is:

1. A microactuated suspension assembly comprising:
    a suspension having a slider mounted proximate a distal end thereof, the suspension further having a recessed portion and a non-recessed surface;
    a microactuator having a grounding surface and a voltage surface; and
    an electrical trace electrically connected to the slider and disposed along the non-recessed surface of the suspension;
    wherein:
    the microactuator is disposed in the recessed portion of the suspension such that the microactuator grounding surface is substantially abutting the recessed portion of the suspension and is grounded thereto, and the microactuator voltage surface is disposed at substantially the same level as the non-recessed surface of the suspension; and
    a microactuator voltage lead extends from the electrical trace and is electrically connected to the microactuator voltage surface such that the electrical trace, the microactuator voltage lead, the microactuator voltage surface, and the non-recessed surface of the suspension all lie at substantially the same level.

2. The microactuated suspension assembly of claim 1 wherein the electrical trace and the microactuator voltage lead each extend over the microactuator voltage surface.

3. The microactuated suspension assembly of claim 1 wherein the microactuator voltage lead is connected to the microactuator voltage surface by at least one of TAB bonding and a solder bump.

4. A microactuated suspension assembly comprising:
a baseplate;
a microactuator having a microactuator first surface and an opposite microactuator second surface;
a load beam coupled to the baseplate;
the microactuated suspension assembly having an assembly surface defining a surface plane;
a portion of at least one of the load beam and the baseplate defining a recessed area that is recessed relative to the surface plane of the assembly surface;
at least a portion of the microactuator first surface being mounted to the recessed area;
a trace having a lead for applying voltage to the microactuator; and
the lead having a lead connection that is attached to the microactuator second surface.

5. The microactuated suspension assembly of claim 4 wherein the lead connection is attached to the microactuator second surface by a solder bump or by a TAB bond.

6. The microactuated suspension assembly of claim 4 wherein the trace is adapted to carry signals to a head of the microactuated suspension assembly and a portion of the trace lies on and extends along the microactuator second surface.

7. The microactuated suspension assembly of claim 4 wherein the load beam is coupled between the baseplate and a load, and wherein the microactuator is configured to expand, responsive to excitation by a voltage, so as to cause rotation of the load with respect to the load beam or the baseplate upon application of the voltage.

8. The microactuated suspension assembly of claim 4 wherein the recessed area is a surface of the baseplate and the assembly surface is a surface of the load beam.

9. The microactuated suspension assembly of claim 4 wherein the recessed area is a portion of the baseplate, and the at least a portion of the first surface is conductively bonded to the baseplate such that the microactuator first surface is electrically grounded to the baseplate.

10. The microactuated suspension assembly of claim 4 wherein the assembly surface is a surface of the load beam, and the portion of at least one of the load beam and the baseplate is a portion of the load beam, and the recessed area is formed by at least one raised portion of the load beam.

11. The microactuated suspension assembly of claim 10 wherein the at least one raised portion includes a pair of opposing raised portions of the load beam, each of the raised portions having an end portion and conductive bonding agent securing the microactuator first surface to the end portions.

12. The microactuated suspension assembly of claim 10 wherein the microactuator second surface is spaced above a plane defined by a top surface of the load beam, and the trace runs along the top surface of the load beam.

13. The microactuated suspension assembly of claim 4 wherein the portion of at least one of the load beam and the baseplate is a portion of the load beam, and the load beam portion includes two spaced L-shaped brackets of the load beam, each of the brackets having a cantilevered leg, and the microactuator first surface is mounted to bottom surfaces of the cantilevered legs.

14. The microactuated suspension assembly of claim 4 wherein the trace and the lead connection lie in the same plane.

15. The microactuated suspension assembly of claim 4 wherein at least one sidewall of the recessed area is formed by the baseplate.

16. The microactuated suspension assembly of claim 4 wherein at least one sidewall of the recessed area is formed by the load beam.

17. In a head suspension assembly for a hard disk drive system including a baseplate coupled to one end of a load beam, a flexure coupled to an opposite end of the load beam, and a slider coupled to a distal end of the flexure, a microactuating system, comprising:
an actuator having a lead connection surface and a grounding surface opposite the lead connection surface;
the actuator being grounded to the head suspension assembly such that the actuator surface closest to the slider is the lead connection surface;
the actuator being mounted in a recessed area of at least one of the baseplate and the load beam; and
a trace having an electrical lead that is adapted to apply voltage to the actuator and is mounted to the lead connection surface by a lead connection.

18. The microactuating system of claim 17 wherein the lead connection is a TAB bond connection or a solder bump connection.

19. The microactuating system of claim 17 wherein the actuator is configured to expand, responsive to excitation by a voltage, so as to cause rotation of the slider with respect to the load beam upon application of the voltage.

20. The microactuating system of claim 17 wherein the grounding surface is grounded to a raised portion of the load beam, and wherein the raised portion comprises one or more single-wing configurations or one or more double-sided wing configurations.

21. The microactuating system of claim 17 wherein the trace and the lead connection lie in the same plane, and a portion of the trace lies on and extends along the lead connection surface.

22. The microactuating system of claim 17 wherein the recessed area is on the load beam.

23. The microactuating system of claim 17 wherein the recessed area is on the baseplate.

* * * * *